United States Patent [19]

Gregory, Sr. et al.

[11] Patent Number: 4,711,403
[45] Date of Patent: Dec. 8, 1987

[54] METHOD AND APPARATUS FOR CLEANING CHICKEN MANURE FROM CHICKEN HOUSES

[76] Inventors: Charles E. Gregory, Sr., 1304 Chauncey Dr., Tarboro, N.C. 27886; Bertram L. Jordan, Pierce St., Box 141, Lewiston, N.C. 27849; Charles E. Gregory, Jr., 1304 Chauncey Dr., Tarboro, N.C. 27886

[21] Appl. No.: 838,156

[22] Filed: Mar. 10, 1986

[51] Int. Cl.⁴ .............................................. B02C 21/02
[52] U.S. Cl. .............................. 241/101.2; 241/101.7; 119/22
[58] Field of Search ................... 241/101.7, 101 B, 81, 241/79, 152 A, 154, 101.5, 101.2; 209/3; 404/91; 119/22

[56] References Cited

U.S. PATENT DOCUMENTS 2,663,555 12/1953 Milliken ............................ 119/22 X
3,263,257 8/1966 Stapleton ........................... 119/22 X
3,412,943 11/1968 Lewis et al. .
4,407,114 10/1983 Zweegers ....................... 241/101.7 X
4,438,885 3/1984 Martin ........................... 241/101.7 X
4,619,412 10/1986 Willingham ...................... 241/101.7

*Primary Examiner*—Mark Rosenbaum
*Attorney, Agent, or Firm*—Mills & Coats

[57] ABSTRACT

The present invention relates to a chicken manure handling machine and system. The chicken manure handling machine is designed to be maneuvered inside a chicken house and is particularly used to automatically clean chicken manure from the chicken house between flocks. As the chicken manure machine is moved through the chicken house, a blade scrapes the caked-like chicken manure and associated litter up from the floor and directs the combined caked material (manure, litter, etc.) upwardly onto an elevator/shaker assembly. As the caked material is conveyed upwardly on the elevator/shaker assembly, the caked manure and associated litter is shaken, causing portions of the associated litter to be separated and to fall through the elevator/shaker assembly onto the chicken house floor where it can be reused by the next flock. The remaining caked material and especially the chicken manure, is conveyed upwardly by the elevator/shaker assembly where it is dumped into a load bed that is mounted on the same frame structure supporting the blade and elevator shaker assembly. The dump bed is movable on frame structure of the machine from a horizontal loading position to a tilted unloading position.

26 Claims, 11 Drawing Figures

METHOD AND APPARATUS FOR CLEANING CHICKEN MANURE FROM CHICKEN HOUSES

FIELD OF INVENTION

The present invention relates to manure handling and more particularly to manure handling machines designed to be maneuvered and employed within an animal house. More particularly, the present invention relates to an automatic chicken manure handling machine that is specifically designed to clean manure from the floor of a chicken house and to separate and recycle portions of litter formally caked and combined with the chicken manure.

BACKGROUND OF INVENTION

Poultry is one of the most economic and nutritious meats available. One of the principal reasons that chicken is so economical is because chicken farmers and processors have a very orderly and organized production plan and program that is highly efficient.

Typically chickens, referred to as broilers, are raised by farmers who in turn have a contract with the large poultry or broiler processor. Generally, small chickens are furnished the farmer by a processor and the farmer manages the feeding and raising of the chickens from small chicks to appropriate broiler size. Ordinarily, the period of raising small chicks to a full grown broiler ready for processing is approximately seven weeks.

One very important key in making broiler production profitable for both the farmer and the processor and for keeping poultry costs relatively inexpensive, is to minimize the time the chicken house remains empty between flocks. Obviously, the more chickens that can be raised for a given time in a certain house, the more profitable the operation.

In the past the real problem in providing a short turn around time between flocks has been the inability to clean and ready the chicken house for the next flock in an expeditious manner. Much valuable time has traditionally been lost in cleaning the manure from the chicken house because it has ordinarily been done manually by hand and shovel. With labor often being in short supply and the nature of this particular job being what it is, this too has added to the difficulty of getting the chicken houses clean in a quick and efficient manner.

Moreover, the cleaning of a chicken house usually has resulted in the entire litter being disposed of. This is because when the house is cleaned by manual labor, there is no practical way to efficiently and by cost effective means to separate reusable litter from the caked manure. Thus, under conventional practices the caked manure and associated litter are removed by hand. Thereafter, a new bed of litter is spread over the floor prior to the new flock of chickens being introduced into the house.

Therefore, there has always been a need for an automatic manure handling system that could be used in the inside of a chicken house to clean the same between flocks.

There has been some prior efforts to automatically clean chicken houses. For example, there has been used a tractor pulled manure scraping and cleaning machine. This machine included a blade and an elevator assembly on a single front mobile frame. The mobile frame supporting the pickup and elevator was in turn attached to a separate trailing trailer. While this machine would pick up manure and transfer it into the trailing trailer it was far from satisfactory.

First, the front mobile frame and the trailing trailer could not be effectively maneuvered within the close confines of a chicken house. Maneuverability has always been one of the most difficult problems to deal with in designing and developing an efficient and practical in-house chicken manure cleaning machine.

Next, the machine was basically designed to pick up manure and did not in reality deal with picking up and reconditioning the litter. Most, if not substantially all, of the litter passed between the blade and the conveyor. In short, the machine was not designed to pick up a layer of caked manure and litter and to direct substantially all of the layer of manure/litter onto an elevator having a positively driven shaker assembly for separating the litter from the manure and returning the litter through the conveyor back to the floor.

SUMMARY AND OBJECTS OF INVENTION

The present invention presents a compact and highly maneuverable in-house manure handling machine that is particularly designed for use in chicken houses. In the case of the present manure handling machine, a tiltable load bed is disposed directly adjacent an elevator/shaker assembly and movably mounted on the same main frame. The tiltable load bed is movable in a rectilinear fashion along the main frame between fore and aft position. In the fore position the front portion of the load bed projects underneath a rear elevated end portion of the elevator/shaker assembly. In the aft position the front portion of the load bed can be moved and tilted upwardly such that manure contained within the load bed can be dumped. Thus, the load bed can move both in a back and forth manner on the main frame as well as in a tilting fashion.

Also contributing to the maneuverability of the manure handling machine of the present invention is a hydraulicly actuated swinging tongue assembly. By actuating the tongue the manure handling machine can be offset with respect to the tractor such that it can reach hard to get to areas that lie around posts, sidewalls, etc.

It is therefore an object of the present invention to provide a compact and highly maneuverable manure cleaning and handling machine that is capable of actually operating inside animal houses.

A further object of the present invention resides in the provision of a manure cleaning and handling machine that will scrape and remove caked material and associated litter from the floor as the machine is moved through the animal house.

Still a further object of the present invention is to provide a chicken manure cleaning and handling machine that is designed to scrape and remove caked chicken manure and litter from the floor, to separate litter from the caked material and return the separated litter to the chicken house floor for subsequent use by the next chicken flock.

Another object of the present invention is to provide a complete in-house chicken manure handling machine on a single four wheel mobile main frame such that all of the working elements of the machine including the load bed are carried by single frame structure.

A further object of the present invention resides in the provision of a chicken manure handling machine of the character referred to above that includes manure spreading mechanism associated with the load bed of the machine for spreading manure thereover while manure is being transferred into the load bed.

Other objects and advantages of the present invention will become apparent and obvious from a study of the following description and the accompanying drawings which are merely illustrative of such invention.

DETAILED DESCRIPTION OF INVENTION

Figure 1:
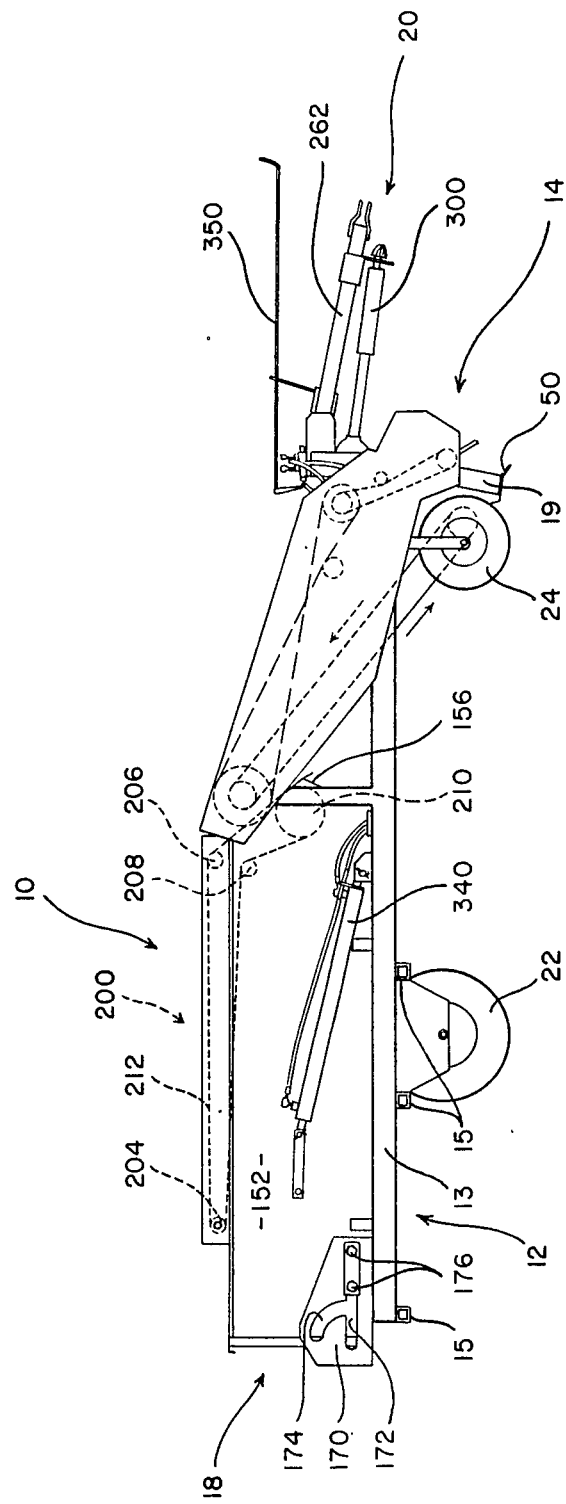
FIG. 1 is a side elevational view of the chicken manure handling machine of the present invention.

Before proceeding with a detailed description of the chicken manure handling machine it will be beneficial to look at the environment in which the machine is designed to operate. As noted before, the growing period for a block of broilers is approximately seven weeks. Between flocks it is necessary to clean the chicken house and that includes removing the chicken manure from the floor of the house. Typically, the chicken manure forms a continuous cake-like consistency about the floor and the manure is usually combined with litter that was placed on the floor between flocks. During the course of the growing period the manure and litter becomes mixed and caked together to form a continuous caked sheet-like material over the entire floor area of the chicken house.

The present invention presents a machine that is designed to move through the chicken house and to scrape up and remove the chicken manure from the floor and in the process to separate portions of the intermixed litter from the manure and to return portions of the separated litter back to the floor for subsequent use.

With particular reference to the drawings, the chicken manure handling machine of the present invention is shown therein and indicated generally by the numeral 10. Viewing the basic components and structure of the chicken manure handling machine 10 it is seen that the same includes a main frame 12, a pick-up assembly 14, an elevator/shaker assembly 16, a load bed 18 and a front swinging tongue assembly 20.

Figure 6:
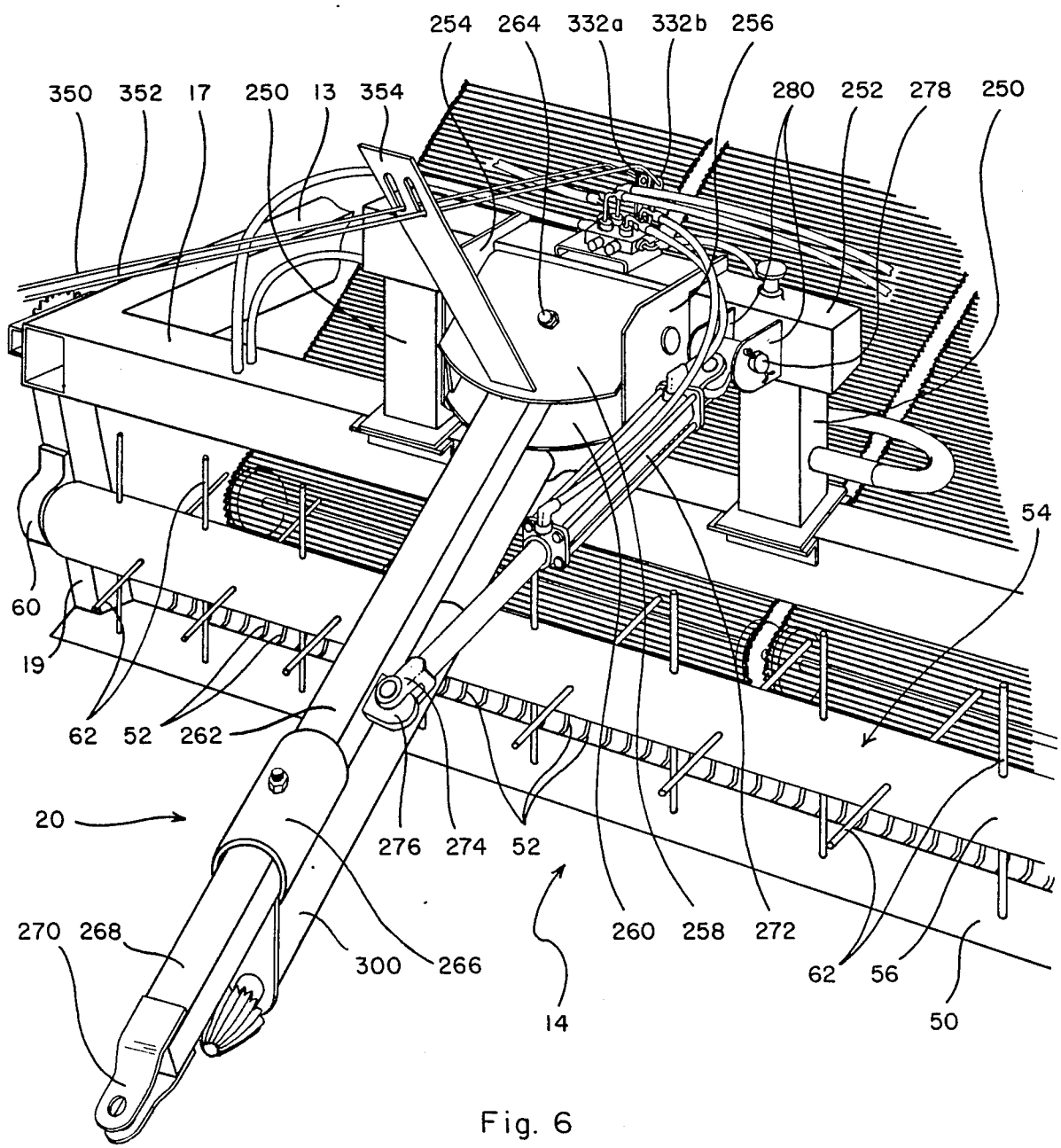
FIG. 6 is a fragmentary front perspective view illustrating the front portion of the chicken manure handling machine of the present invention.

Main frame structure 12 is designed to support the entire structure of the machine 10. As particularly seen in FIGS. 1, 2 and 3, main frame structure 12 includes a pair of laterally spaced longitudinal members 13 that are interconnected about the rear portion of the machine of a series transverse cross members 15. About the front of main frame structure 12 is a front cross member 17 (FIG. 6).

Figure 3:
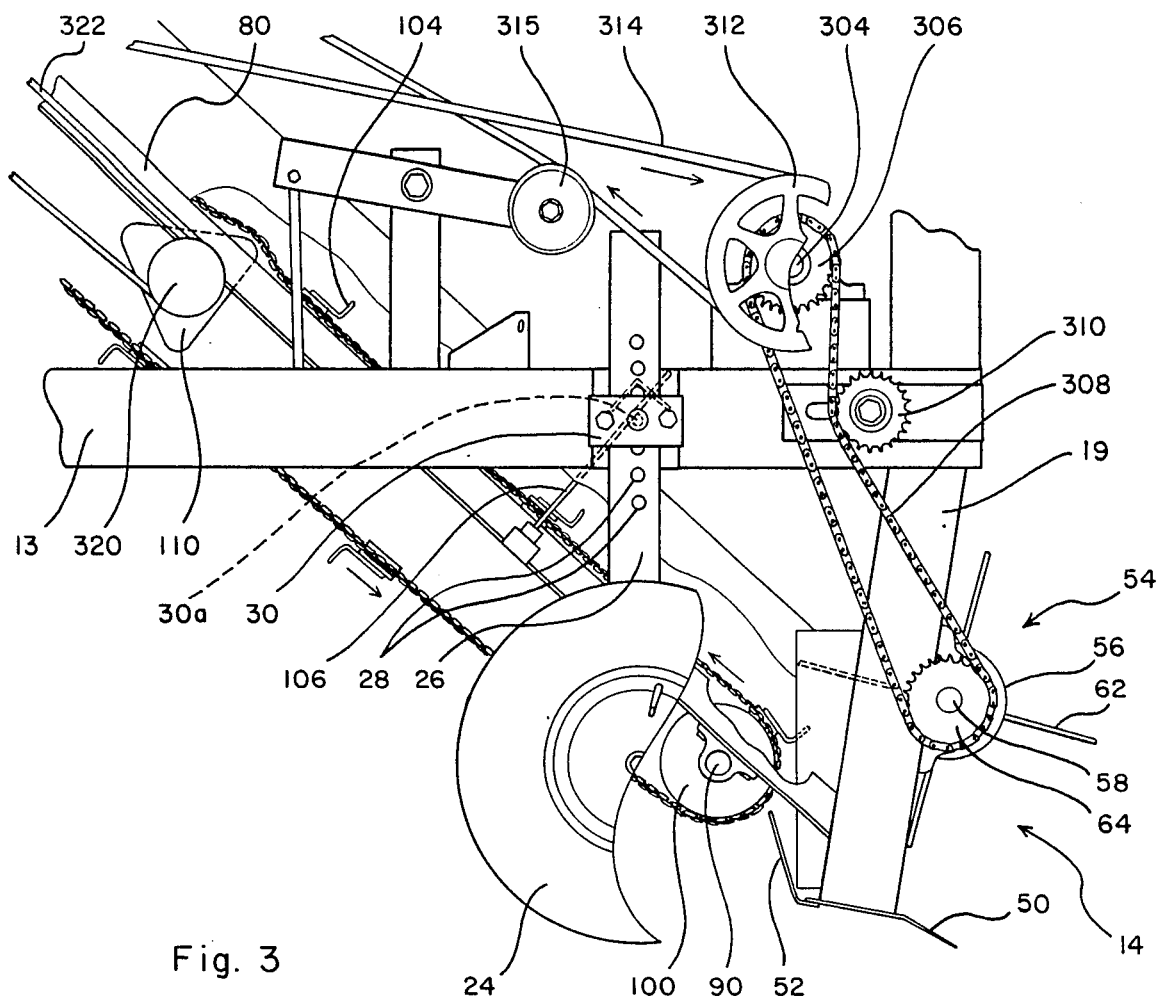
FIG. 3 is a fragmentary side elevational view of a front portion of the chicken manure handling machine of the present invention with portions broken away to better illustrate various parts of the machine.

Main frame structure 12 is mobile and is provided with a pair of rear wheels 22 and a pair of front adjustable gage wheels 24. As will be appreciated from subsequent portions of this disclosure, the front gage wheels 24 are adjustable in height such that the pick-up assembly 14 can be appropriately adjusted with respect to the underlying floor of a chicken house in order to effectively and efficiently scrape and clean chicken manure from the floor of the chicken house. Attention is directed to FIG. 3 where a detail is shown of an adjustable front gage wheel 24. Note that the same includes an adjustable leg 26 that includes a series of vertically spaced openings 28 formed therein. Sandwiching adjustable leg 26 against a portion of a respective longitudinal frame member 13 is a locking bar 30. Locking bar 30 is secured to the longitudinal frame member 13 by a pair of bolts and includes an inner projecting stud 30a that extends through a respective opening 28 within adjustable leg 26 so as to anchor and station the respective front gage wheel 24 at a selected position with respect to the main frame structure 12.

Extending downwardly from the front end of main frame structure 12 is a pair of laterally spaced legs 19 that act to support the pick-up assembly 14.

Turning to pick-up assembly 14 it is seen that the same comprises a transverse blade 50, having a tapered edge, which is secured to the bottom portions of legs 19 of the main frame structure 12. Secured to the rear terminal edge of blade 50 is a series of spaced apart upturned lifting fingers 52.

Spaced above blade 50 and extending thereacross is a rotary finger bar assembly 54 that aids in breaking up and directing the caked manure and associated litter rearwardly after it has been urged upwardly from the chicken house floor by blade 50 (see FIG. 6). Viewing finger bar assembly 54 it is seen that the same includes a rotor cylinder 56 that includes a pair of stub shafts 58 that extend outwardly from each end. Respective stub shafts 58 are supported by a bearing 60 which is in turn secured to a respective downwardly depending leg 19, that as referred to above, extends from front portion of the main frame structure 12. As shown in FIG. 6, a series of rigid fingers 62 extend radially outwardly from rotor cylinder 56. To drive finger bar assembly 54 there is provided a drive sprocket 64 (FIG. 3) which is secured to a respective stub shaft 58 that extends from rotor cylinder 56.

As will be appreciated from subsequent portions of this disclosure, the finger bar assembly 54 is designed to be driven clockwise as viewed in FIG. 3. As the finger bar assembly 54 is driven in such a fashion, the respective fingers 62 engage the layer of caked material passing over blade 50 and generally act to urge the material rearwardly. In the process the respective fingers 62 tend to break up the caked material and to some extent tends to begin separating associated litter from the caked material.

Figure 4:
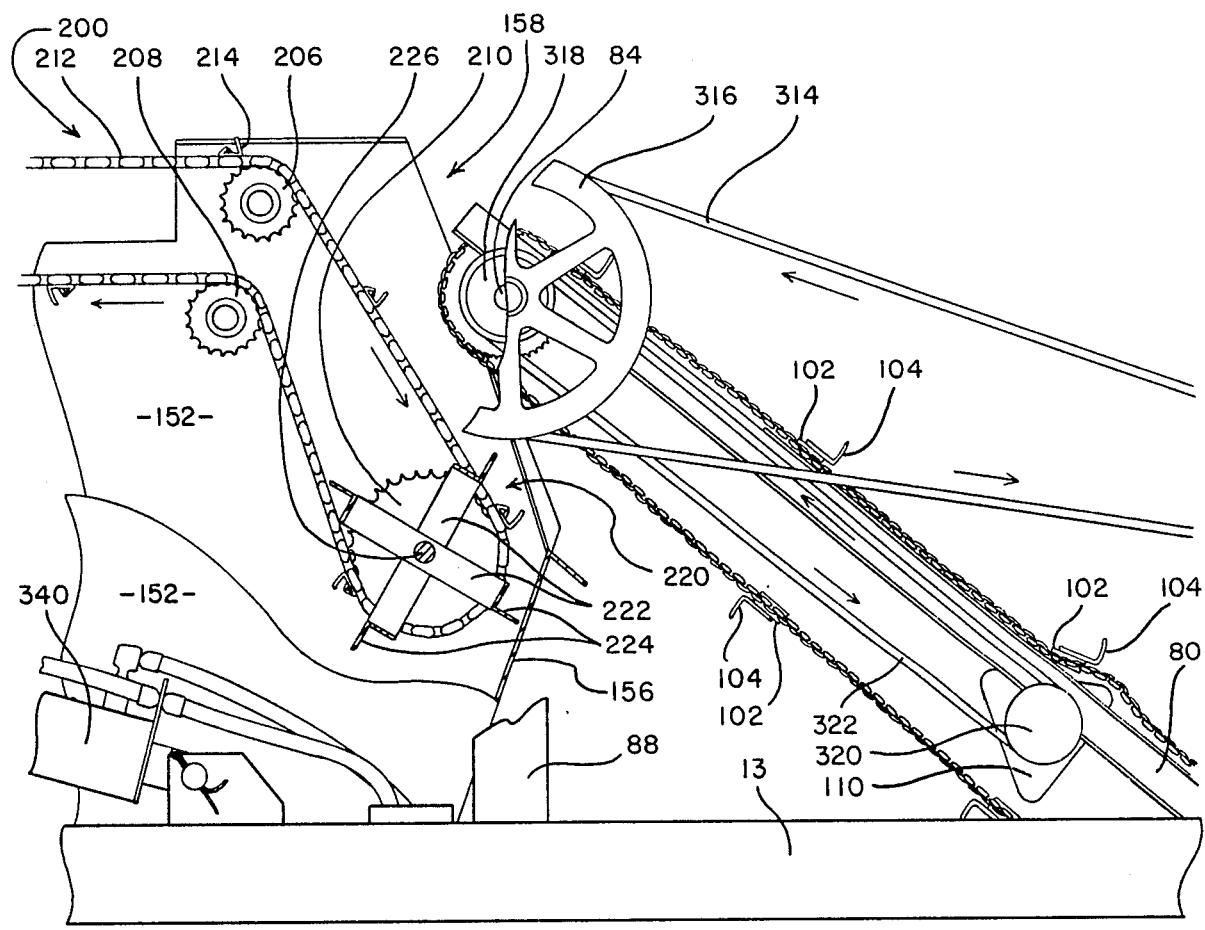
FIG. 4 is a fragmentary side elevational view of an intermediate portion of the chicken manure handling machine of the present invention particularly illustrating the relationship of the elevator/shaker assembly to the load bed when the load bed assumes a loading position.
Figure 5:
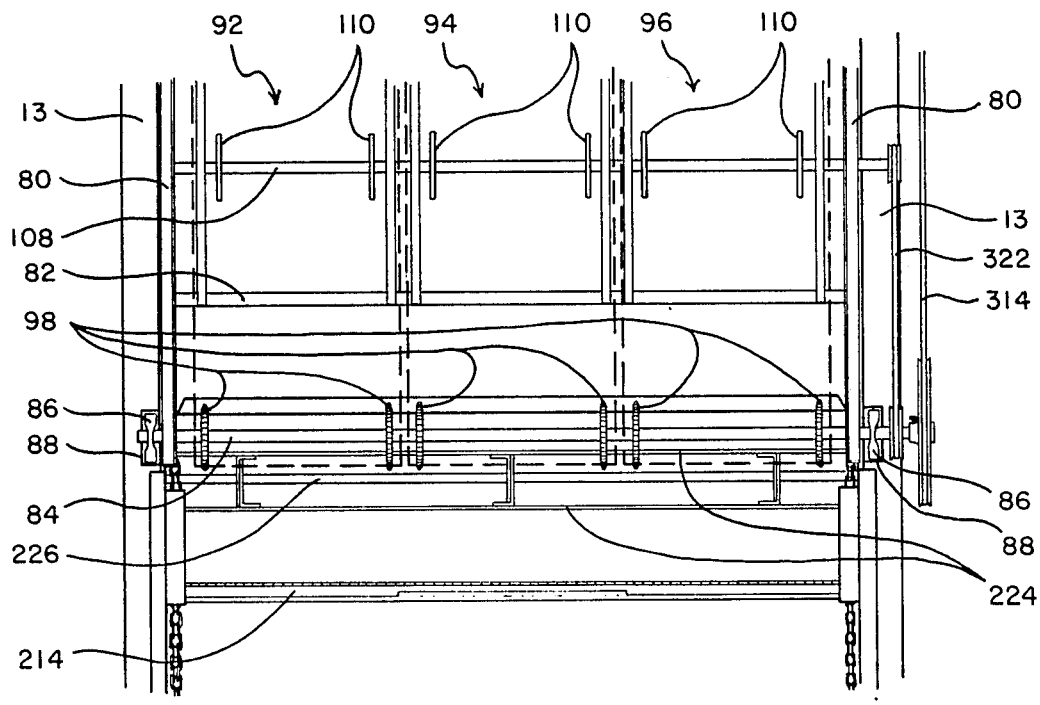
FIG. 5 is a fragmentary top plan view showing the portion of the chicken manure handling machine and particularly illustrating the relationship of the elevator/shaker assembly with the front of the load bed when the load bed assumes the loading position. (Shown in FIG. 4).

Secured to the main frame structure 12 and disposed behind the pick-up assembly 14 is the elevator/shaker assembly 16. Viewing elevator/shaker assembly 16 in detail, the same includes a pair of laterally spaced side frame members 80 that are interconnected by a series of transversely extending members 82 (FIGS. 4 and 5). This forms the basic frame structure of the entire elevator/shaker assembly.

The elevator/shaker assembly is supported about the rear by a main drive shaft 84 that is rotatively journaled within a pair of bearings 56 that are secured to a pair of upstanding posts 88 that extend upwardly from the longitudinal members 13 of main frame 12. About the front lower portion of the elevator/shaker assembly 16 there is provided a transverse idler shaft 90 (FIG. 3). Idler shaft 90 is rotatively journaled to bearings supported by the side frame members 80 and acts to support the elevator/shaker assembly 16 about the lower front end.

Figure 2:
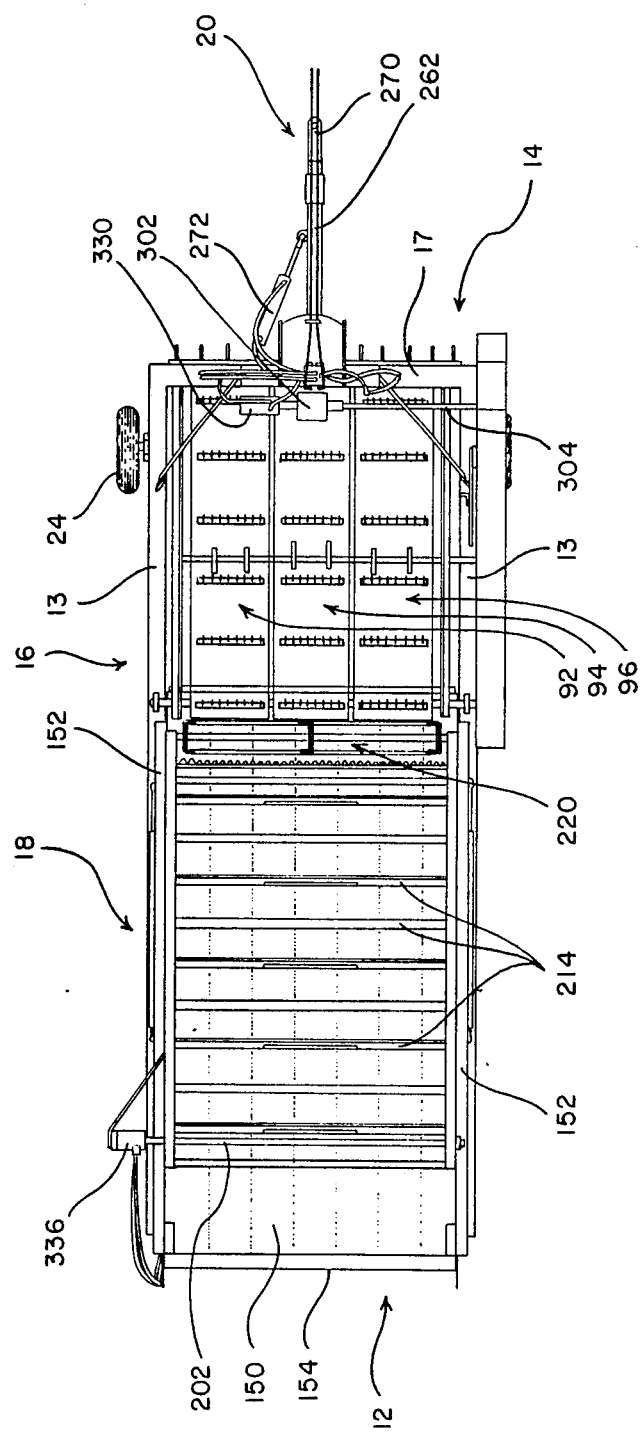
FIG. 2 is a top plan view of the chicken manure handling machine of the present invention.

Elevator/shaker assembly 16 in the embodiment disclosed shows three side-by-side longitudinal chain link conveyor assemblies referred to generally by the numerals 92, 94 and 96 (FIGS. 2 and 5). Each chain link conveyor assembly 92, 94 and 96 includes a pair of drive sprockets 98 that are secured on main drive shaft 84. In addition, each chain link conveyor assembly 92, 94 and 96 includes a pair of idler wheels 100 which are secured to lower idler shaft 90. Each chain link conveyor assembly is trained around a respective pair of drive sprockets 98 and a respective pair of idler wheels 100.

To assist the elevator/shaker assembly in conveying material upwardly, each chain link conveyor assembly 92, 94 and 96 includes a carrier bar that comprises a bar 102 secured directly to the chain link conveyor with a plurality of upturned fingers 104 secured to the bar 102. These carrier bars as shown in FIGS. 3 and 4 are spaced around the entire run of each endless chain link conveyor assembly 92, 94 and 96.

The frame structure of the elevator/shaker assembly 16 is secured and supported about its lower front portion by an adjustable support 106 (FIG. 3) which extends between a respective longitudinal members 13 and a respective side frame member 80. Support structure 106 is adjustable in order that the lower front portion of the entire elevator/shaker assembly 16 can be adjusted with respect to frame structure 12 and pick-up assembly 14.

Extending transversely between the upper and lower runs of the longitudinal chain link conveyor assemblies 92, 94 and 96 is a shaker drive shaft 108. Shaker drive shaft 108 is journaled for rotation within bearings supported on side frame members 80. Axially spaced on shaker drive shaft 108 is a series of triangular shaped cams 110. The triangular shaped cams 110 are so spaced and arranged such that pair of each underlie the respective upper run of each longitudinal chain link conveyor assembly 92, 94 and 96.

As will be seen and appreciated from subsequent portions of this disclosure, the turning of shaker drive shaft 108 results in the triangular shaped cams 110 actually engaging the upper run of the respective chain link conveyor assemblies 92, 94 and 96 and causing them to shake in the process. This shaking and jarring action results in litter being separated from the caked manure and material being conveyed upwardly on the elevator/shaker assembly. Because the elevator/shaker assembly 16 is open, the shaking action caused by the triangular shaped cams 110 causes and induces the separated litter to fall through the elevator/shaker assembly 16 back onto the underlying floor of the chicken house where it can be used by the next flock of chickens.

Supported by the main frame 12 and disposed rearwardly of the elevator/shaker assembly 16 is a movably mounted load bed 18. Viewing load bed in detail it is seen that the same comprises a bottom 150, two sidewalls 152, an open rear end provided with a gravity actuated tailgate 154 and a pointed front end that includes a short front panel 156 with an open area 158 formed thereabove.

Figure 7:
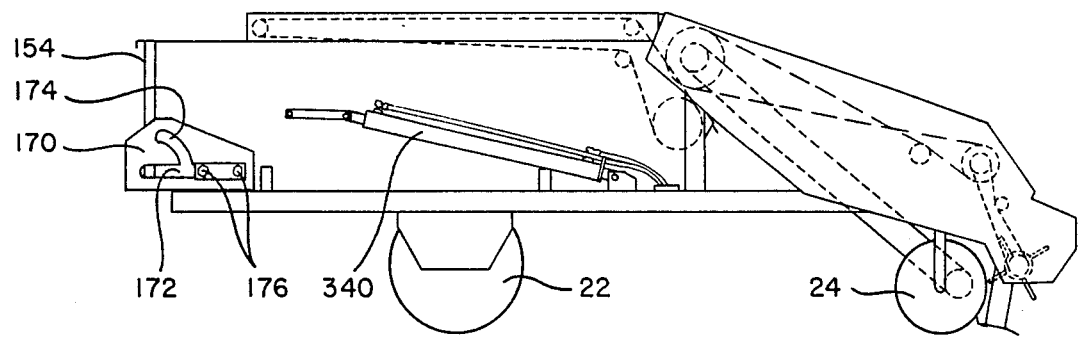
FIG. 7 is a side elevational view of the chicken manure handling machine of the present invention with the load bed thereof beign shown in its forwardmost loading position.
Figure 8:
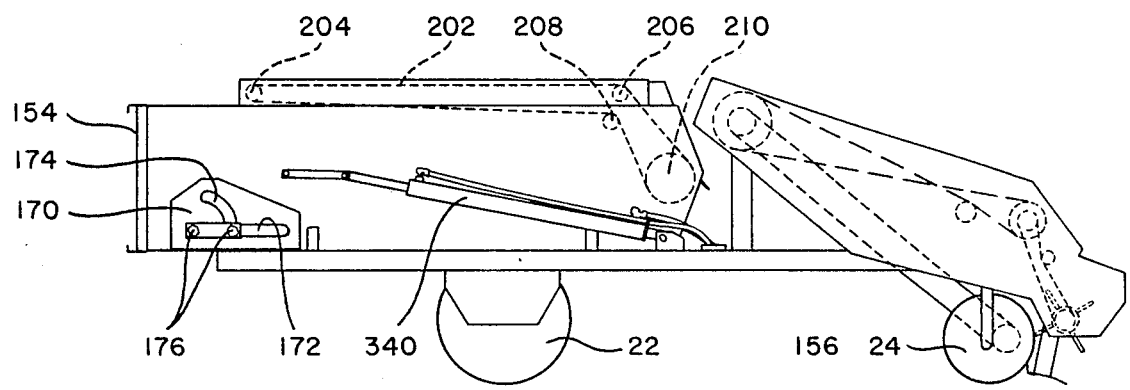
FIG. 8 is a side elevational view of the chicken manure handling machine with the load bed being moved rearwardly on the machine's main frame structure.
Figure 9:
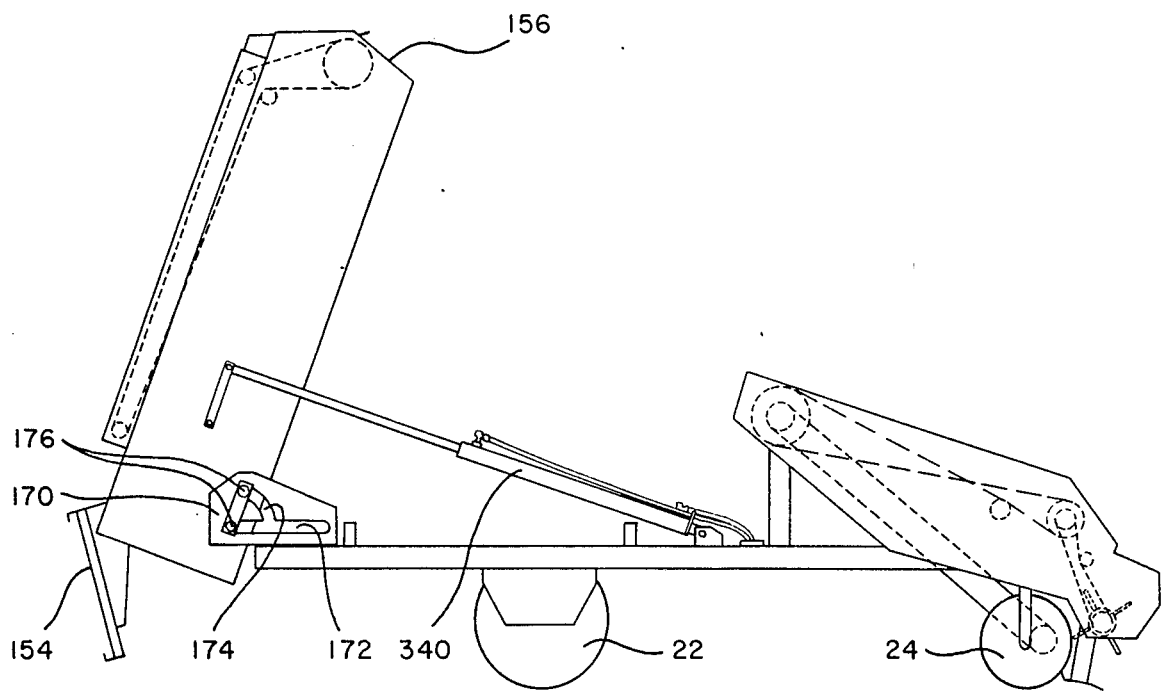
FIG. 9 is a side elevational view of the chicken manure handling machine with the load bed shown in a tilted loading position.

Load bed 18 is movable between a loading position, Figure 7, and an unloading position, FIG. 9. In the unloading position, load bed 18 is tucked underneath the rear discharge and of the elevator shaker assembly 16. As particularly illustrated in FIG. 4, note that the lower front portion of load bed 18 projects under the discharge end of the chain link conveyor assemblies 92, 94 and 96 when the load bed assumes the loading position. As particularly illustrated in the drawings and again as shown in FIG. 4, in the loading position the rear discharge end of the chain link conveyor assemblies 92, 94 and 96 project into the open upper area 158 defined above front panel 156. This obviously allows chicken manure to fall into the front portion of load bed 18.

To move from the loading position shown in FIG. 7 to the unloading positio shown in FIG. 9, load bed 18 must be moved in a rearwardly rectilinear fashion a selected distance before it is tilted upwardly in order tha the front end of the load bed 18 may clear the rear portion of the elevator/shaker assembly 16. As will be discussed in more detail subsequently herein, this movement is achieved by a pair of hydraulic cylinders.

To control the movement of load bed 18 there is provided a pair of attitude control plates 170 that are secured on each side of the load bed to the machine's main frame 12. Each attitude control plate 170 includes a fore and aft slot 172 and a tilt slot 174 that extends upwardly and rearwardly from the fore and aft slot 172 in an arcuate fashion. Secured to each side 152 about the rear of load bed 18 is a pair of rollers 176 that are actually confined within the attitude control plate 170. As load bed 18 is moved fore and aftly on main frame 12, rollers 176 simply move back and forth and are confined within the lower and aft slot 172. Attitude control plate 170 and the slots formed therein are designed such that once the rearmost roller of the pair of rollers 176 engage the rear edge of the fore and aft slot 172 that continuous rearward force by the hydraulic cylinders will cause the load bed 18 to tilt as shown in FIG. 9 and in the process the forwardmost roller of the pair of rollers 176 will move upwardly and rearwardly in the tilt slot 174. Thus, it is appreciated that the attitude control plate 170 controls the attitude and movement of the load bed 18 as it is moved back and forth between its loading position and its unloading position.

Disposed in the top of load bed 18 is a manure spreader assembly 200. Spreader assembly 200 operates to convey and spread manure received in the front portion of load bed 18 to the intermediate and rearmost areas of the load bed.

Viewing spreader assembly 200 it is seen that the same includes a transverse drive shaft 202 that is secured across the top rear portion of the load bed 18. A pair of sprockets 204 are secured on each end of drive shaft 202. In addition, about the front inner side of each sidewall 152 there is provided a pair of idler sprockets 206 and 208. Finally, about the inner front side of each sidewall 152 there is provided a front end main idler sprocket 210.

The spreader assembly includes two endless chains 212, each chain being trained around a respective set of sprockets formed about one sidewall of load bed 18. That is, each chain 212 is trained around a rear sprocket 204, idler sprockets 206 and 208, and around front end main sprocket 210. At selected intervals a cross spreader bar 214 is secured to and between the respective chains 212. Each cross bar 214 includes an outer exposed serrated edge that effectively engages and carries manure from a front portion of load bed 18 to intermediate and rear portions. Note in FIG. 4 that the chains 212 and respective cross bars 214 move in a counter clockwise fashion around front end main sprockets 210.

Interconnected between front end main sprockets 210 is a beater assembly 220, as particularly illustrated in FIG. 4. Beater assembly 220 comprises an elongated shaft 226 that is secured to and rotatable with front sprockets 210. Axially spaced along shaft 226 at selected intervals is a pair of cross radial bars 222. Extending transversely across the outer edge of the respective radial bars is a plurality of L-shaped cross bars 224. It is noted from FIG. 4 that the L-shaped cross bars 224 actually project outwardly from the plane of the chains 212 and the respective cross bars 214 carried thereby. The beater assembly 220, however, is particularly designed, shaped and timed such that the cross bars 224 always project outwardly between the cross bars 214 carried by the pair of spreader chains 212. Thus, there is no possible interference between the L-shaped cross bars 224 and the cross bars 214 carried by chains 212.

Thus, in the loading position as shown in FIG. 4, caked manure falls from the rear discharge end of the elevator assembly 16 and falls through the upper front opening area 158 onto the rotating beater assembly 220. The beater assembly 220 tends to break up the large chunks of caked manure in order to facilitate the spreading of the manure over the entire area of the load bed 18. Also, it is appreciated that the respective cross bars 214 carried by chains 212 of spreader assembly 200 acts to engage the manure falling from the elevator assembly and also acts to engage manure accumulating in the front end portion of the load bed 18 so as to transfer and carry the manure toward the rear of load bed 18 and to uniformly spread the manure throughout load bed 18.

Now turning to the front end of chicken manure handling machine 10 and its tongue assembly 20, it is seen that there is provided a tongue mounting structure secured to front transverse main frame member 17. In particular, the tongue mounting structure comprises a pair of upstanding vertical members 250 and a transverse cross tubular member 252 which also serves as a hydraulic reservoir (FIG. 6). Projecting forwardly from cross member 252 is a pair of laterally spaced plates 254 and 256. Secured between plates 254 and 256 is a pair of base tongue plates 258 and 260, with the base tongue plates as seen in FIG. 6 being vertically spaced apart. A tongue member 262 is pivotably mounted for side to side movement between base tongue plates 258 and 256 by a vertical pivot pin 264. Moreover, tongue plates 258 and 260 and tongue member 262 can pivot upwardly and downwardly about a transverse pivot pin.

Connected to tongue section 262 is a coupler 266. Coupler 266 receives a front tongue extension 268 and is connected in such a way that the front tongue extension 268 can rotate a limited amount back and forth about the axis of coupler 266 and tongue section 262. This limited rotation is beneficial when the machine is moved from side to side with respect to the pulling tractor. Extending forwardly from the front tongue extension 268 is a connecting clevis 270 that enables the entire tongue assembly to be attached to a draw bar of a tractor.

In order to offset the entire chicken manure machine 10 with respect to the tractor, the present machine is provided with a hydraulic cylinder 272 which can be remotely actuated from the tractor to swing the entire tongue assembly 20 back and forth so as to effectively offset the entire machine with respect to the tractor. Hydraulic cylinder 272, as best seen in FIG. 6, includes a rod end 274 that is connected to a tab 276 that extends from tongue section 262. Hydraulic cylinder 272 is anchored to the tongue mounting structure by a pivot pin 278 that is secured between a pair of mounting ears 280.

It is appreciated from viewing FIG. 6 that by extending and retracting the rod of hydraulic cylinder 272 that one can swing the entire tongue assembly 20 from side to side and can effectively adjust the trailing position of the chicken manure handling machine 10 with respect to the tractor.

Figure 3A:
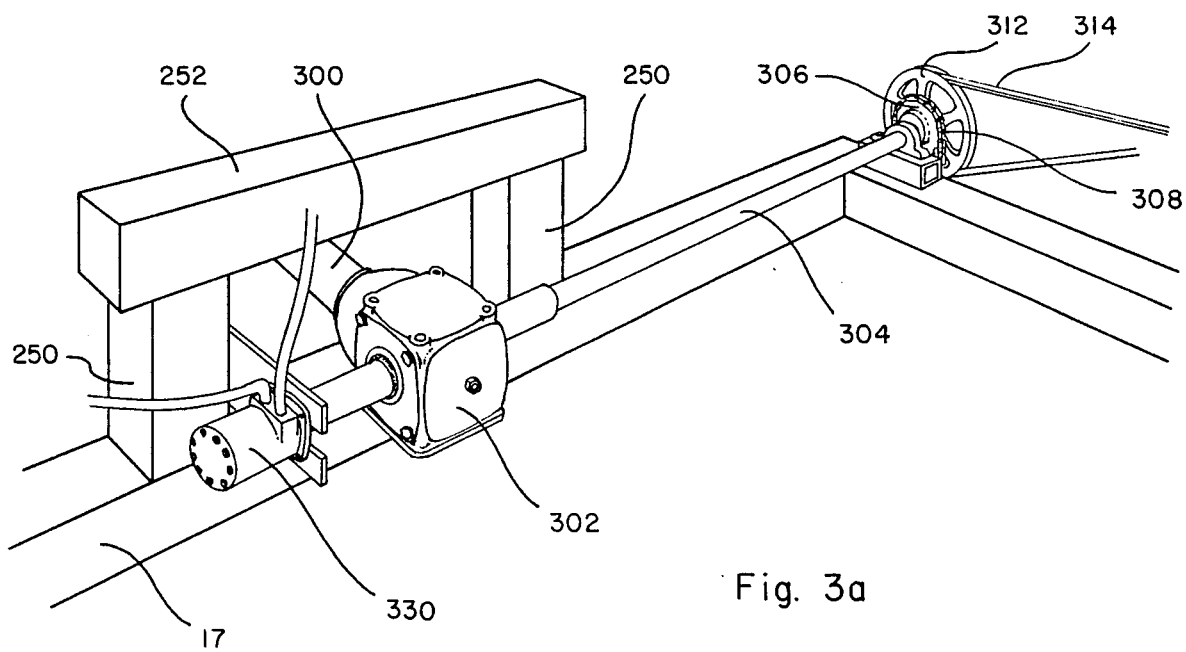
FIG. 3a is a fragmentary perspective view of an area of the chicken manure handling machine illustrating a part of the mechanical and hydraulic drive system.

To drive the chicken manure handling machine 10 of the present invention, there is provided a main PTO drive shaft 300 that as viewed in FIG. 6, extends below the tongue assembly 20 and moves back and forth therewith. PTO drive shaft 300 extends underneath plates 258 and 260 and connects to a gear box 302 that is supported below the cross tubular member 252 that forms a part of the tongue mounting structure (FIG. 3a). Gear box 300 acts to provide direct mechanical drive for certain elements of the chicken manure handling machine and also acts as a primary drive for the hydraulic drive system to be discussed subsequently herein.

First, with respect to the mechanical drive, there is provided a jack shaft 304 (FIG. 3a) that connects to gear box 302 and which extends outwardly therefrom toward the side of the machine shown in FIGS. 1 and 3. As particularly shown in FIG. 3 and 3a, about the outer end of jack shaft 304 there is keyed a drive sprocket 206. Drive chain 308 is trained around drive sprocket 306 as well as idler sprocket 310 and is further trained around drive sprocket 64 which is secured to shaft 58 which forms a part of the pick-up assembly 14.

Secured to jack shaft 304 outwardly drive sprocket 306 is a drive sheave 312. A belt 314 is trained around drive sheave 312 and extends rearwardly therefrom where it is trained around a driven sheave 316 that in turn is keyed to elevator/shaker assembly drive shaft 84. It is noted that in order to drive sheave 316 in the desired direction that belt 314 is crossed and in the process is trained around an idler 315.

Secured inwardly of driven sheave 316 is a drive sheave 318 that again is keyed to elevator/shaker assembly drive shaft 84. The belt 322 is trained around drive sheave 318 and extends to where the same is also trained around driven sheave 320. Driven sheave 320 is keyed to the shaker drive shaft 108.

Therefore, it is appreciated that jack shaft 304 effectively drives pick-up assembly 14, the respective chain link conveyor assemblies 92, 94 and 96, as well as the shaker assembly underlying the upper runs of the respective chain link conveyor assemblies.

Figure 10:
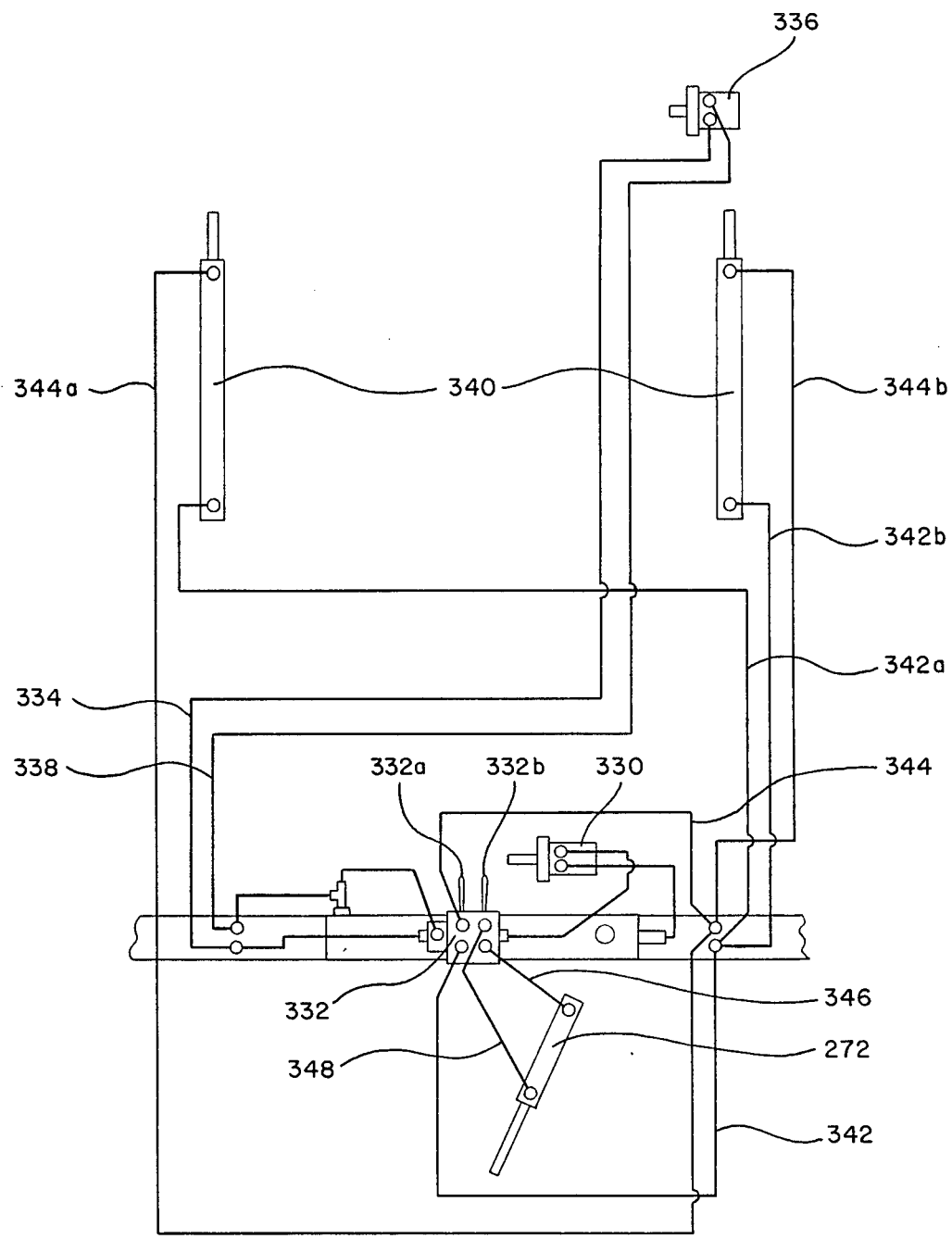
FIG. 10 is a schematic illustration of the hydraulic drive system of the chicken manure handling machine of the present invention.

With reference to the hydraulic drive system, attention is particularly directed to the schematic illustration found in FIG. 10. Gear box 302, referred to above, is also operative to drive a main hydraulic pump 330, as is shown in FIG. 3a. Hydraulic pump 330 is operatively connected to the hydraulic reservoir that is formed internally of the upper cross member 252 that extends over the front transverse main frame member 17.

Operatively connected to hydraulic pump 330 is a control valve 332 that in the embodiment disclosed herein is secured to the top reservoir 252. Control valve 332 includes two mechanical actuaters 332a and 332b.

In a normal operating mode control valve 332 is designed to continuously direct oil from the oil reservoir 252, through hydraulic pump 330, and through control valve 332 into line 334 that leads to spreader hydraulic drive motor 336. Spreader drive hydraulic motor 336 is operatively connected to the spreader assemblies 200 and drive shaft 202 thereof. Hydraulic fluid leaving spreader drive motor 336 returns to the reservoir 252 via line 338. Consequently, in the normal operating mode the spreader assembly 200 is driven continuously.

To move load bed 18 back and forth between its loading and unloading positions there is provided a pair of double acting hydraulic cylinders 340. As shown in the drawings, a hydraulic cylinder 340 is provided on each side of the load bed 18 and is anchored to the main frame 12 and includes a rod end that connects to a sidewall 152 of the load bed 18.

With reference to FIG. 10, mechanical valve actuater 332a controls the actuation of hydraulic cylinders 340. To move the load bed rearwardly from its loading position, actuater 332a is appropriately actuated causing oil passing through the valve 332 to be directed from the valve into extending line 342. Extending line 342 includes a tee and from the tee branches off to form two supply lines 342a and 342b. It is seen that each of the supply lines 342a and 342b extend to the anchor end of the respective load bed actuating cylinders 340.

To retract hydraulic cylinders 340 and to move the load bed 18 from an unloading position to a loading position, mechanical actuater 332b is actuated and oil is directed from valve 332 into retracting feed line 344. Retracting feed line 344 includes a tee and from the tee there extends a pair of retracting lines 344a and 344b. The respective retracting lines 344a and 344b each extend respectively to the rod end of a respective load bed hydraulic cylinder 340.

Finally, actuater 332b controls the flow of oil through lines 346 and 348 to the tongue actuating hydraulic cylinder 272. As seen in FIG. 10, directing oil from the control valve 332 through line 348 results in the extended rod being retracted into the hydraulic cylinder 272. Directing fluid into line 346 results in the rod being extended from hydraulic cylinder 272.

To control the control valve 332 from an attached tractor, there is provided a pair of control rods 350 and 352. Control rods 350 and 352 are connected to a selected control valve actuater 332a or 332b. From the respective control actuaters, the control rods 350 and 352 extend to the tractor through a pair of openings in a support plate 354 that extends upwardly from the upper tongue plate 258.

In operation the chicken manure handling machine 10 is attached to a tractor and pulled through a chicken house to clean and remove chicken manure from the floor of the house. Front gage wheels 24 are particularly adjusted with respect to the main frame 12 such that blade 50 assumes an appropriate height just above the level of the floor to be cleaned.

Before beginning the cleaning process, the tractor's PTO is actuated causing the pick-up assembly 14 to begin operation as well as the elevator/shaker assembly 16. In addition, this causes the hydraulic drive system to be actuated resulting in the operation of the manure spreader assembly 200 that is disposed about a top portion of load bed 18.

As the chicken manure handling machine 10 is pulled through the house, blade 50 engages the caked manure and other associated material and especially litter, and scrapes the material up onto blade 50. As the tractor pulls the machine through the house, the caked material rides up onto and over blade 50. The upturned fingers 52 direct the caked material onto the respective chain link elevator assemblies 92, 94 and 96. As the caked material passes over blade 50, fingers 62 of the finger bar assembly 54 engages the caked material, tending to break the material into smaller pieces and chunks while at the same time tending to assist in conveying and moving material passing over blade 50 rearwardly.

As the caked manure and other associated material is lifted by fingers 52, the material is directed onto the lower front end of the elevator/shaker assembly 16. From here the material is conveyed upwardly and rearwardly. During the conveying operation the actuation of the shaker assembly lying under the upper runs of the conveyors tends to shake and jar the caked material in the process. This shaking and jarring tends to separate litter from the caked material and the separated litter falls through the elevator/shaker assembly 16 onto the underlying clean floor and can therefore be used by the next flock of chickens.

During this process load bed 18 assumes the loading position shown in FIG. 7. Thus, manure discharged by the elevator/shaker assembly 16 falls into the front portion of load bed 18. The spreader assembly 200 tends to carry and direct the manure to the intermediate and rear portions of the load bed so as to uniformly load the same. In addition, beater assembly 220 disposed about the lower front portion of load bed 18 again tends to beat the chunks and cakes of manure up into smaller pieces that can be more readily transferred and spread by the spreader assembly 200.

Once load bed 18 has been filled, the chicken manure handling machine is then directed from the chicken house to an unloading location. To unload a filled bed of manure, hydraulic control valve 332 is actuated to extend the rods of hydraulic cylinders 340. The actuation of hydraulic cylinders 340 first result in the load bed 18 moving gently and easily rearwardly along main frame structure 12 in a rectilinear fashion. Once load bed 18 has moved back such that its front portion can clear the rear portion of the elevator/shaker assembly 16, then the load bed 18 is prepared to tilt upwardly. Upon the rearmost roller 176 engaging the rear terminal end of slot 172, the load bed 18 is constrained to move upwardly in a tilting fashion as illustrated in FIG. 9. Once elevated as shown in FIG. 9, the gravity actuated tailgate 154 opens and the manure within load bed 18 is allowed to pass from the rear end of the bed. By appropriately actuating hydraulic control valve 332, the rods of hydraulic cylinders 340 are retracted and during this retraction the load bed 18 is first tilted back down to its horizontal position after which it is pulled forwardly to its loading position as shown in FIG. 7.

In order to clean manure from areas adjacent the sidewalls or areas around posts, etc., the operator of the tractor can selectively position the chicken manure handling machine 10 with respect to the tractor. This is again accomplished by the operator actuating control valve 332 to actuate hydraulic cylinder 272. By actuating hydraulic cylinder 272 it is seen that the tongue assembly 20 can be moved back and forth so as to particularly offset machine 10 with respect to the tractor.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An in-house chicken manure handling machine for cleaning and removing chicken manure and associated litter from the floor of a chicken house wherein the chicken manure and associated litter are often caked together and form a combined layer of manure and litter on the chicken house floor, said chicken manure handling machine comprising:
   a. a mobile frame structure;
   b. a pair of rear wheels mounted about a rear portion of said frame structure and a pair of front gage wheels mounted about the front of said frame structure;
   c. chicken manure pick-up means mounted on front of said frame structure for scraping manure and associated litter from the floor of the chicken house, said chicken manure pick-up means including transverse blade means that extend across the front of said frame structure for engaging, scraping and lifting chicken manure and associated litter from the floor of the chicken house;
   d. said front gage wheels including means for adjusting the height of said blade means relative to an underlying surface so as to adjust the depth that said blade means will penetrate the layer of chicken manure and associated litter being removed;
   e. an elevator-shaker assembly mounted on said frame structure and disposed rearwardly of said blade means, said elevator-shaker assembly including an open-type elevator means for receiving the manure and associated litter picked up by said blade means and for conveying the chicken manure and associated litter upwardly and rearwardly therefrom toward an elevated discharge end of the conveyor means;
   f. said elevator-shaker assembly including shaker means for shaking said elevating means and the manure and associated litter thereon as it is transferred toward the discharge end of said conveyor means and for separating litter from the manure in the process a the shaking conveyor means tends to break up and separate litter from the manure resulting in the litter falling through the open-type conveyor means onto the floor of the chicken house as the manure handling machine is moved through the house;
   g. a movable load bed mounted to said same frame structure and disposed rearwardly of said elevator-shaker assembly for receiving manure and any other material discharged from the discharge end of said conveyor means;
   h. means for movably mounting said load bed for both fore and aft movement on said frame structure;
   i. load bed control means for moving said load bed fore and aftly on said frame structure between a loading position where a front end portion of said load bed underlies the discharge end of said conveyor means and a rearward dumping position; and
   j. said control means including means for raising the front of said load bed relative to the rear of said load bed when said load bed assumes a dumping position on said frame structure such that material within said load bed can be discharged therefrom.

2. The in-house chicken manure handling machine of claim 1 comprising load bed attitude control means for limiting the rearward movement of said load bed on said frame structure and for automatically urging the front end portion of said load bed upwardly in response to the load bed moving rearwardly and reaching a selected area on the frame structure.

3. The in-house chicken manure handling machine of claim 2 wherein said load bed attitude control means includes a structure having slot means formed therein and wherein said load bed includes guide means attached to the load bed which are also confined within said slot means and wherein the movement of said load bed is governed by the movement of said guide means within said slot means.

4. The in-house chicken manure handling machine of claim 3 wherein said slot means includes a fore and aft slot and an arcuate shaped slot and wherein said guide means secured to said load bed and confined within said slot means includes roller means which move back and forth in said fore and aft slot and up and down within said arcuate shaped slot.

5. The in-house chicken manure handling machine of claim 4 wherein said load bed control means includes a pair of hydraulic cylinders operatively connected to said load bed for moving the same between said loading and unloading positions, and wherein said hydraulic cylinders are oriented relative to said load bed and said slot means such that in moving said load bed from said loading position to said unloading position said roller means are moved rearwardly in said fore and aft slot to a point where further rearward movement is restricted at which time the hydraulic cylinders are operative to tilt the front end portion of said load bed upwardly in which case said roller means tends to move upwardly within said arcuate shaped slot.

6. The in-house chicken manure handling machine of claim 1 further comprising a spreader assembly mounted to said load bed and including means for engaging manure dumped into the front end of said load bed and spreading the manure rearwardly throughout the load bed.

7. The in-house chicken manure handling machine of claim 6 further comprising a manure beater assembly mounted in the front of said load bed for engaging chunks and cakes of manure delivered to said load bed and breaking the chunks and cakes of manure into smaller pieces.

8. The in-house chicken manure handling machine of claim 7 wherein said manure beater assembly is disposed at least in part interiorly of the path of said spreader assembly.

9. The in-house chicken manure handling machine of claim 6 wherein said spreader assembly includes a pair of laterally spaced flexible carriers appropriately trained around an endless path, and a series of cross members interconnected between said pair of flexible carriers with said cross members serving to engage and spread manure throughout said load bed as said flexible carriers are deiven about an endless path.

10. The in-house chicken manure handling machine of claim 1 wherein said pick-up means includes a rotary finger bar assembly rotatively mounted over said blade means for engaging the manure and associated material passing over said blade means and functioning to assist in breaking up the manure and associated material passing over said blade means as well as functioning to urge the material rearwardly.

11. The in-house chicken manure handling machine of claim 10 wherein said pick-up means further includes upturned finger means secured to said blade means and directed toward the front of said conveyor means for directing manure and associated material from said blade means to said conveyor means.

12. A pull-type chicken manure handling machine adapted to be pulled through an animal house and to scrape and clean caked manure and associated litter from the floor, comprising:
 a. a mobile main frame structure;
 b. pick-up means mounted on said main frame structure for scraping manure and associated litter from the floor of the animal house;
 c. open type conveyor means mounted rearwardly of said pick-up means for receiving manure and associated litter from said pick-up means and conveying the manure and litter rearwardly on the frame structure, said conveyor means including an elevated rear discharge end;
 d. means for shaking said conveyor means and separating litter from the manure and returning the separated litter to the floor through said open-type conveyor means as said machine is pulled through the animal house;
 e. a movable load bed integrally mounted on the rear of said main frame structure rearwardly of said pick-up means and said conveyor means, said load bed normally assuming a loading position where the front end thereof underlies the rear discharge end of said conveyor means;
 f. load bed mounting means for movably mounting said load bed for both fore and aft movement as well as tilting movement on said frame structure; and
 g. load bed control and drive means for moving said load bed from said loading position rearwardly on said main frame structure a selected distance at which point the the load bed is tilted to an unloading position by lifting the upper end of said load bed allowing manure to gravitate from the rear thereof, said control and drive means further functioning to lower the load bed from said unloading position back onto said main frame structure and then to move said load bed forwardly on said main frame structure to its normal loading position.

13. The in-house chicken manure handling machine of claim 12 wherein said load bed control and drive means includes a plate secured to said main frame structure adjacent each side of said load bed with each plate having a defined slotted area formed therein, and wherein there is provided roller means confined within said slotted area and movable therein to control the attitude and position of said load bed as it is moved between said loading and unloading positions.

14. The in-house chicken manure handling machine of claim 13 wherein said load bed includes a front end that comprises a front wall that is designed to lie under the rear discharge end of said conveyor means when said load bed assumes said loading position, and wherein said load bed includes a front open area defined above said front wall wherein in said loading position the rear discharge end of said conveyor means projects rearwardly through said front open area in said load bed.

15. The in-house chicken manure handling machine of claim 12 including a manure spreader assembly mounted in the top portion of said load bed and including means for engaging manure discharged into the front end of said load bed and spreading that manure rearwardly throughout the load bed.

16. An in-house chicken manure handling machine for cleaning and removing chicken manure and associated litter from the floor of a chicken house wherein the chicken manure and associated litter are often caked together to form a combined manure-litter layer on the chicken house floor, said chicken manure handling machine comprising: a mobile frame structure; pick-up means mounted on the front of the frame structure for engaging and scraping a layer of manure-litter from the floor of the chicken house; an elevator-shaker assembly mounted on the same frame structure rearwardly of the pick-up means; load bed means mounted on the same frame structure rearwardly of the elevator-shaker assembly for receiving manure discharged by the elevator-shaker assembly; said pick-up means including blade means for engaging and lifting a layer of combined manure-litter from the chicken house floor and transferring substantially the entire lifted manure-litter layer upwardly onto the elevator-shaker assembly; the elevator-shaker assembly including an open type conveyor means for receiving the manure-litter layer and for conveying the same upwardly and rearwardly towards an elevated discharge end of the conveyor means; and wherein the elevator-shaker assembly further includes shaker means for shaking the elevator means and the manure-litter thereon as it is transferred upwardly towards the discharge end of the conveyor means and the separating litter from the manure-litter layer in the process as the shaking conveyor means tends to break up and separate litter from the caked manure-litter layer resulting in the separated litter falling through the open type conveyor means onto the floor of the chicken house as the manure handling machine moves through the house, 17. The in-house chicken manure handling machine of claim 16 including means for movably mounting said load bed means for movement between a horizontal transport position and an inclined dumping position.

18. The in-house chicken manure handling machine of claim 17 including means for moving the loadbed means for back and forth linear movement between first and second positions on the mobile frame structure wherein in the first position the loadbed means assumes a position underneath the discharge end of the conveyor means and in the second position assumes a position spaced rearwardly from the discharge end of the conveyor means.

19. The in-house chicken manure handling machine of claim 18 including means for automatically moving the loadbed means from the horizontal transport position to the inclined dumping position in response to the loadbed means moving from the first position to the second position where it is spaced rearwardly from the discharge end of the conveyor means.

20. The in-house chicken manure handling machine of claim 16 wherein the pickup means includes a tranversely extending blade including means secured to the rear thereof and projecting upwardly therefrom for guiding and directing substantially the entire layer of caked manure and litter picked up by the blade means up onto the elevator-shaker assembly where litter is separated from the manure as the caked manure and litter move up the elevator-shaker assembly resulting in the separated litter falling through the elevator-shaker assembly back onto the floor of the chicken house.

21. The in-house chicken manure handling machine of claim 16 including front gauge wheels secured to the mobile frame structure for adjusting the height of the blade means relative to the floor of the chicken house so as to adjust the depth that the blade means will penetrate the layer of chicken manure and associated litter.

22. The in-house chicken manure handling machine of claim 16 further comprising a spreader assembly mounted on the load bed and including means for engaging manure dumped into the front end thereof and spreading the manure rearwardly throughout the load bed; and a manure beater assembly mounted in the front of the load bed for engaging chunks and cakes of manure delivered to the load bed and breaking the chunks and cakes of manure into smaller pieces.

23. The in-house chicken manure handling machine of claim 22 wherein the manure beater assembly is disposed at least in part in the path of the spreader assembly.

24. The in-house chicken manure handling machine of claim 16 wherein the pickup means further includes a rotary finger bar assembly rotatively mounted over the blade means for engaging the combined manure—litter layer passing over the blade means and functioning to assist in breaking up the manure-litter layer passing over the blade means as well as functioning to urge the material rearwardly and upwardly onto the elevator-shaker assembly.

25. The in-house chicken manure handling machine of claim 16 including a powered swinging tongue assembly, movably mounted to the mobile frame structure for allowing the manure handling machine to be shifted from side to sdie relative to a pulling tractor in order that the manure handling machine can be positioned to efficiently clean areas adjacent side walls and internal posts of a chicken house.

26. The in-house chicken manure handling machine of claim 16 wherein said elevator-shaker assembly includes an endless, open type conveyor having an upper run and a lower run, and wherein the shaker means is disposed intermediately between the upper and lower runs and engages the upper run as the same passes thereover so as to impart a shaking action to the upper run as material is transferred up the elevator-shaker assembly.

* * * * *